United States Patent [19]

McIntyre

[11] Patent Number: 4,722,646

[45] Date of Patent: Feb. 2, 1988

[54] CARGO SECURING DEVICE

[75] Inventor: Jim McIntyre, Northport, Ala.

[73] Assignee: Cargo-Tite, Inc., Northport, Ala.

[21] Appl. No.: 915,981

[22] Filed: Oct. 6, 1986

[51] Int. Cl.⁴ .............................................. B61D 45/00
[52] U.S. Cl. ..................................... 410/138; 410/137
[58] Field of Search ................. 410/94, 129, 130, 132, 410/133, 134, 137, 138, 139, 142; 296/51, 56, 57 R; 292/7, 36, DIG. 62

[56] References Cited

U.S. PATENT DOCUMENTS

| | | | |
|---|---|---|---|
| 846,913 | 3/1907 | Daugherty | 296/51 X |
| 880,010 | 2/1908 | Caha | 296/51 |
| 2,961,262 | 11/1960 | Nockels | 296/57 R X |
| 3,265,433 | 8/1966 | Shea | 296/57 R |
| 3,440,764 | 4/1969 | Cover | 296/56 |
| 3,590,747 | 7/1971 | Solomonson et al. | 410/138 |

Primary Examiner—Johnny D. Cherry
Assistant Examiner—John Pido
Attorney, Agent, or Firm—Nies, Webner, Kurz & Bergert

[57] ABSTRACT

A device for use in securing cargo in a stationary position on the bed of a truck or similar vehicle is disclosed. The device includes a movable partition having spring biased locking pins on the outer ends thereof which may be releasably secured in any of a series of holes spaced at intervals along a railing attached to either side of the length of the truck bed. Upon operation of a handle mechanism located in the central upper portion of the partition, the locking pins may be unlocked, allowing the partition to be moved on caster wheels mounted for movement along the interior length of the railings until the desired position is reached at which point the handle is released, causing the pins to lock into the adjacent openings in the railing.

8 Claims, 7 Drawing Figures

CARGO SECURING DEVICE

BACKGROUND AND SUMMARY OF THE INVENTION

The present invention relates to a partition for maintaining cargo in a stationary position so as to prevent the cargo from sliding either to the front or rear of the bed of a pick-up truck or similar vehicle. More particularly, the present invention relates to a partition or panel which is capable of being moved along the length of the truck bed by the operation of a spring loaded handle which controls horizontal locking pins on either side of the truck bed.

Previous apparatus for securing loads in a cargo carrying vehicle is described in the following U.S. Pat. Nos. 2,697,631 to Miller; 3,324,595 to Loomis; 3,467,028 to James; 3,641,941 to Sanders; 4,278,376 to Hunter; and 4,507,033 to Boyd.

By the present invention, there is provided an improved load securing apparatus for a cargo carrying vehicle. The apparatus of the pesent invention includes a movable partition having spring biased locking pins on the outer ends thereof which may be releasably secured in any of a series of holes spaced at intervals along a railing attached to either side of the length of the truck bed. Upon operation of a handle mechanism located in the central upper portion of the partition, the locking pins may be unlocked, allowing the partition to be moved on caster wheels located in the interior of the railings toward the front or rear of the truck until the desired position is reached at which point the handle is simply released, causing the pins to lock into the adjacent openings in the railing. The apparatus is so constructed as to allow the partition to be reversed end for end as desired. When the partition is not in use, it can be conveniently locked in position at the front of the truck bed.

DESCRIPTION OF THE PREFERRED EMBODIMENTS

Figure 1:
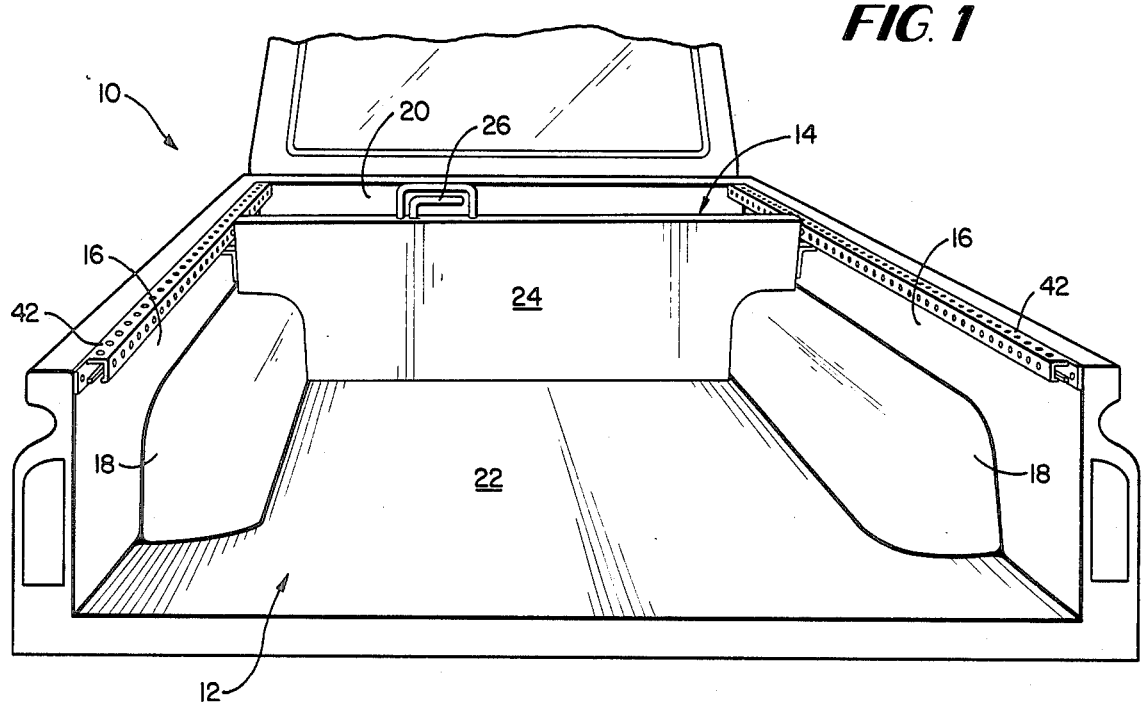
FIG. 1 is a perspective view of the rear portion of a vehicle body, showing the apparatus of the invention installed therein.

In the embodiments of the invention as shown in FIGS. 1 through 7, there is provided a cargo vehicle 10 such as a conventional pick-up truck with an open load space 12 having the load securing device 14 with partition 24 mounted therein. The vehicle load space 12 is generally rectangular and defined by side walls 16, internal wheel fenders 18 and forward wall 20 and has a generally flat bed 22. The tail gate (not shown) may be removed when the load securing device 14 is utilized or it may be retained as desired.

As shown in FIG. 1, the interior wheel fenders 18 protrude into the cargo load space 12 and the partition member 24 must be sized such that its transverse length will pass between the shorter distance between the spaced interior wheel fenders 18. In one embodiment, the partition 24 is constructed of galvanized steel with flanges 25 extending perpendicularly from the edge surfaces of partition 24 so as to provide a shallow open box-like construction within which the locking mechanism is retained.

The means for positioning the partition or panel 24 along the length of the truck bed includes a handle assembly 26 pivotally connected by bolt 30 with a release plate 28 which is connected through a rod linkage 32 on each side of the handle to a spring mechanism 34. The handle 26 passes through opening 27 in the upper flange 25 of the partition 24 and is pinned to the release plate 28 by mounting bolt 30. Lock rings 29 are employed to pivotally connect the rods 32 with the release plate 28 and the respective spring mechanism 34. Each spring mechanism 34 includes a pinholder block 38 secured to the partition 24 and having mounted thereon a cylinder 37 with chamber 39 extending throughout the length of the cylinder 37. A rod member 41 of reduced diameter relative to the chamber 39 extends through the chamber 39 from pivotal connection with the rod 32 and is secured to a locking pin 40 mounted horizontally for locking engagement with a railing 42 which is secured to and extends horizontally along each of the two opposite side walls 16 of the truck flat bed 22. A pair of bushings 36 are secured one at each end of the chamber 39 and a coiled spring member 43 is positioned on the rod member 41 so as to be biased between the inner bushing 36 and locking pin 40.

The handle 26, which is of a generally C-shaped configuration, is provided at its lower end with a vertical arcuate channel 50 in which is seated a pivot pin 52 secured to the partition 24. The disk shaped release plate 28 is centrally mounted for rotation on the pin 52. The channel 50 is of suitable length so as to allow the handle 26 to move upwardly while the release plate 28 is rotated during the act of unlocking the pins 40, with the various components moving from the position shown in FIG. 3 to that shown in FIG. 4.

Each railing 42 is of generally square cross section, having a series of holes 48 equally spaced along the inner side wall and holes 54 equally spaced along the top wall of the railing 42. A central channel 56 is provided along the length of the lower wall 58 of the railing 42.

Figure 5:
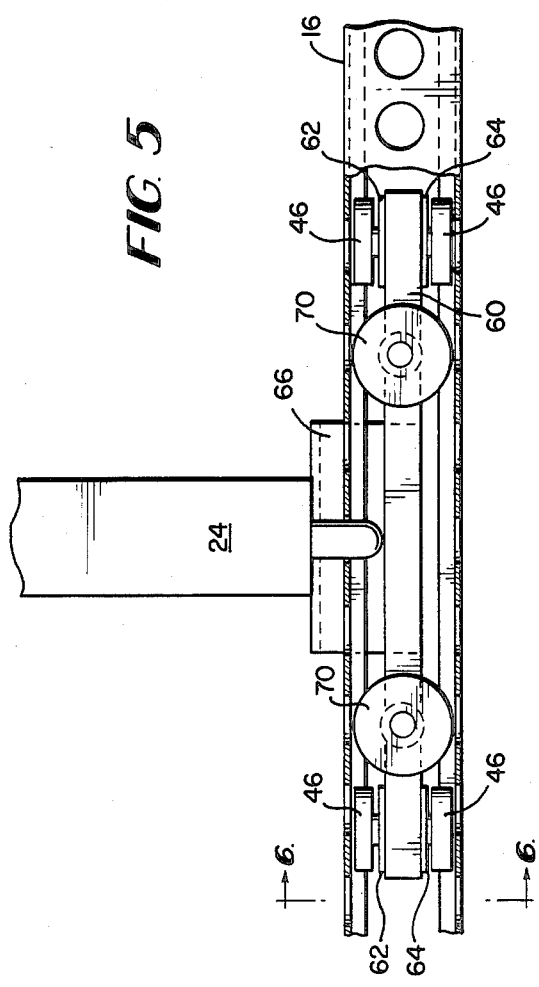
FIG. 5 is a plan view in partial section of a portion of the railing along one of the sides of the truck bed.
Figure 6:
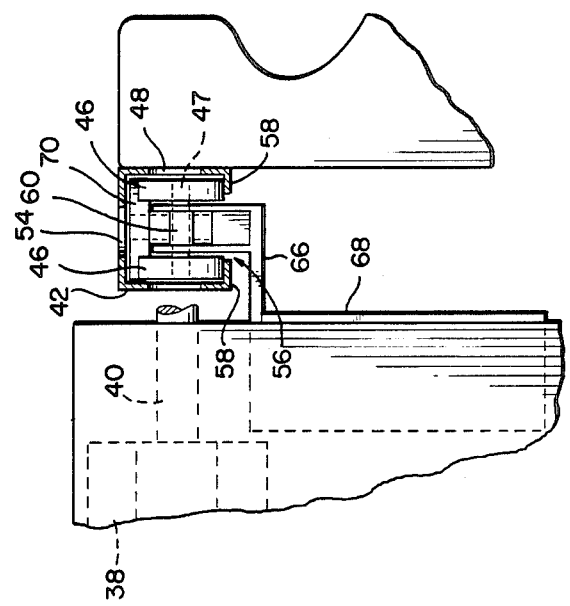
FIG. 6 is a sectional view taken along line 6—6 of FIG. 5.

Mounted within each railing 42 are two pairs of ball bearing caster rollers 46, as shown in FIG. 5, with each pair of rollers 46 being mounted on a respective transverse shaft 47 as shown in FIG. 6. The rollers 46 rest on the lower wall portions 58 of each railing 42. Each roller shaft 47 is mounted for rotation in a support bar 60 mounted on parallel vertical members 62, 64 which are secured to horizontal plate 66. A block member 67 supports the lower end of support members 62, 64. The plate 66 is secured to the side of the partition 24 and supported by vertical plate 68 attached to the side wall of the partition 24. A pair of rotatable guide members 70 are mounted on the support bar 60 to assist in proper positioning of the caster wheels 46 within the railings 42.

Figure 2:
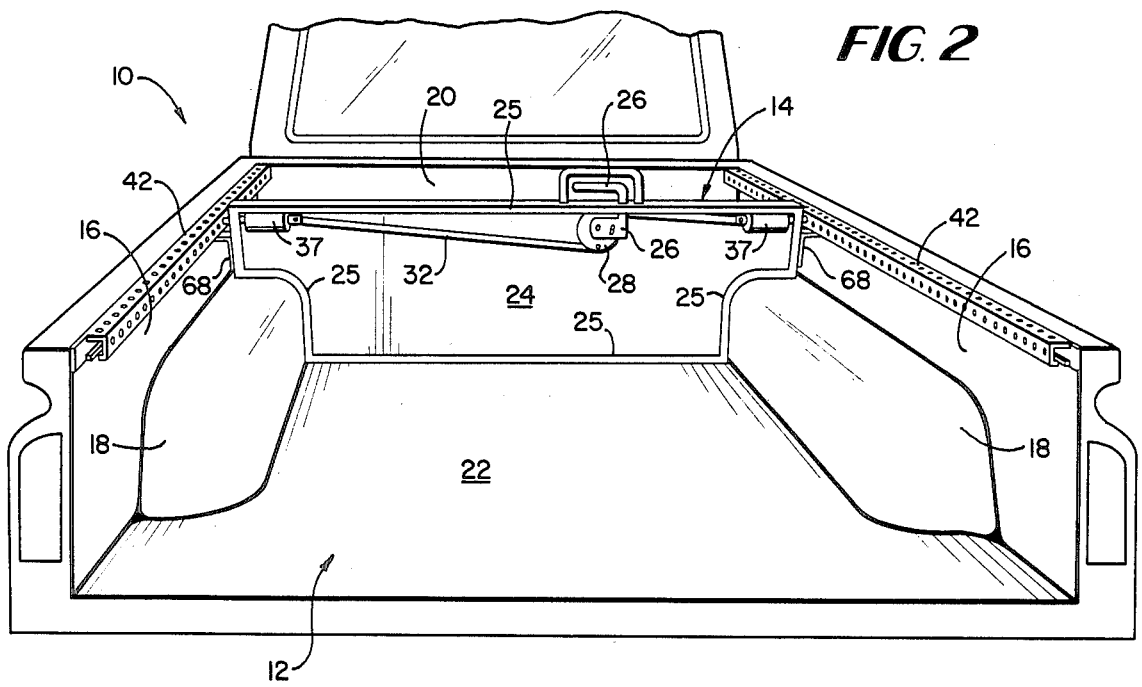
FIG. 2 is a perspective view showing an alternative embodiment of the apparatus of the invention installed in a vehicle body.
Figure 3:
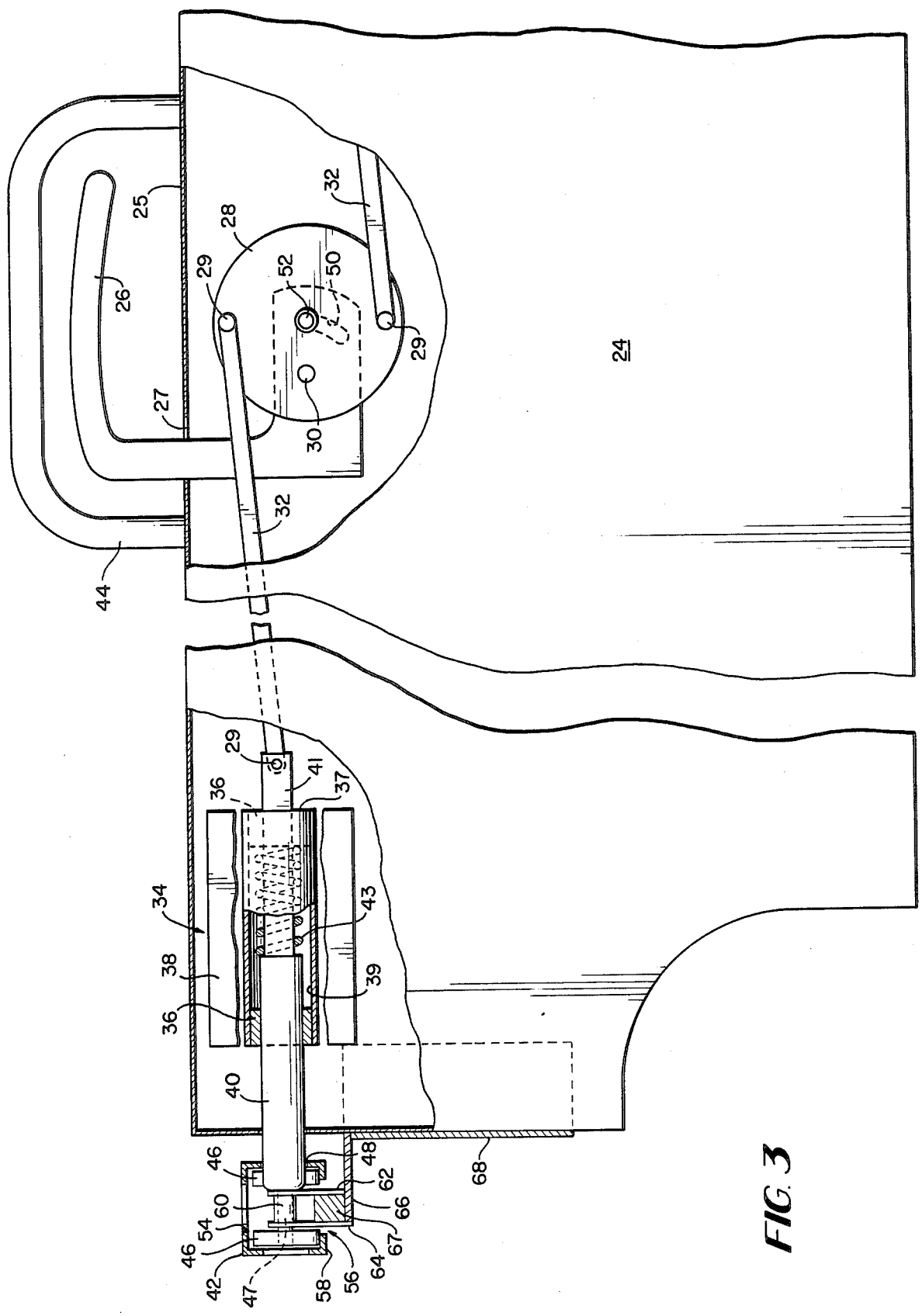
FIG. 3 is a partial front elevation of the partition member of the apparatus of FIG. 1 showing the handle in the inactive or locked position.

As shown in FIGS. 1 and 2, the partition 24 may be installed so that the locking mechanism is accessible either toward the front or rear of the truck bed, and so that the partition 24 is directly adjacent the cargo to be secured.

Figure 4:
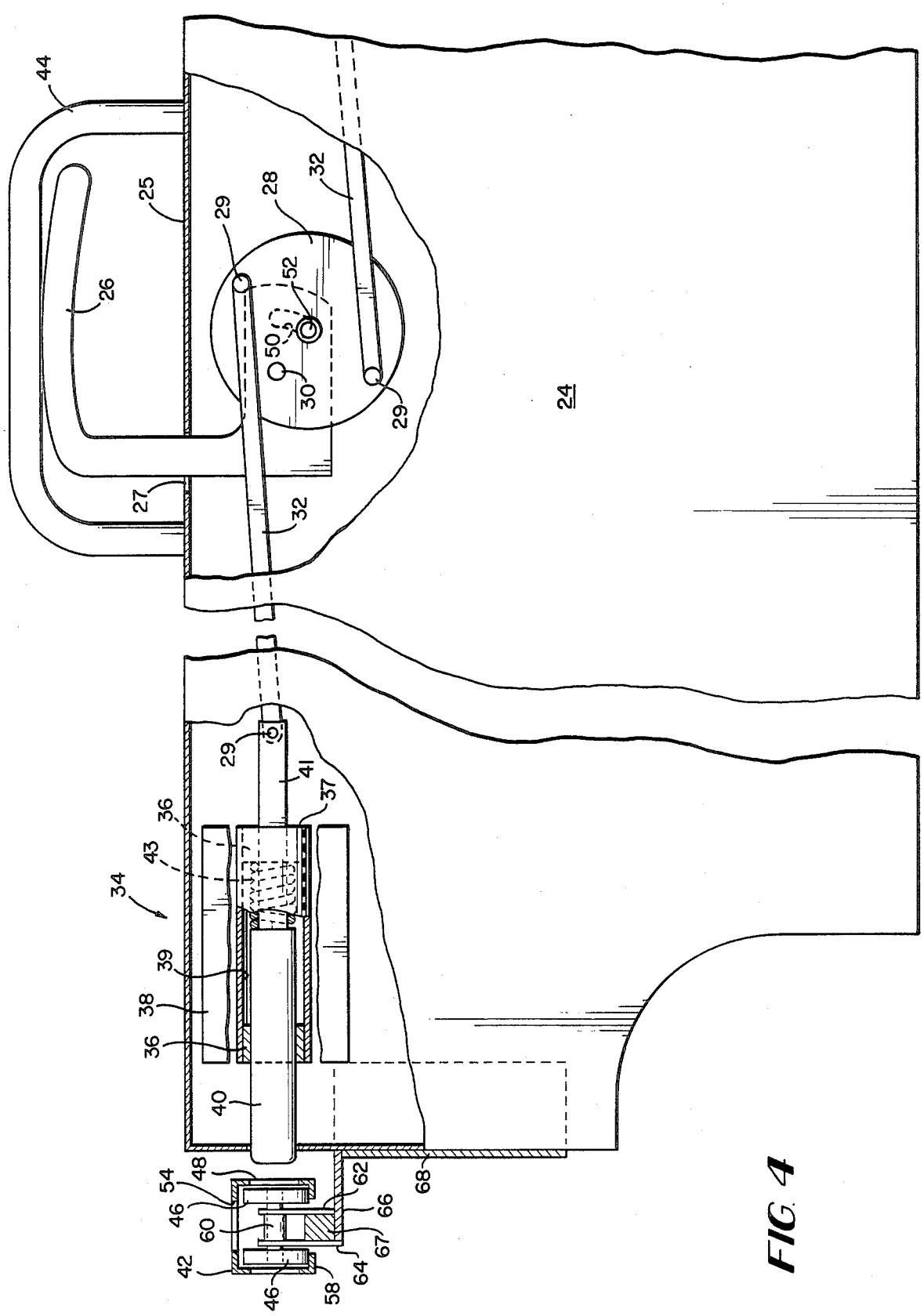
FIG. 4 is a partial elevation similar to FIG. 3 showing the handle in the activated or unlocked position for movement of the partition along the length of the truck bed.
Figure 7:
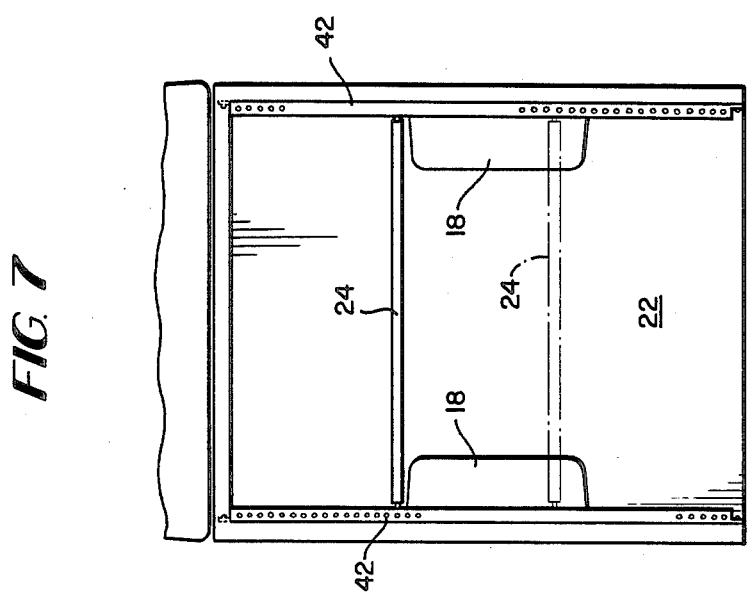
FIG. 7 is a plan view of a truck bed showing the partition member as moved from a first position to a second position along the length of the truck bed.

The movable partition or panel 24 is moved or adjusted by grasping the spring loaded handle 26 and pulling upward toward the grip member 44, thereby releasing the locking pins 40, as the spring 43 is compressed, as shown in FIG. 4, and thus allowing the partition 24 to be moved freely from the front to the back of the truck bed on the ball bearing casters 46 mounted within the railings 42. Once in place, one simply releases the handle 26 and the force of spring 43 is sufficient to lock the pins 40 into the next closest hole 48 in the railings 42 while allowing the handle 26 to return to the position shown in FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An improved cargo securing device for use in preventing cargo from sliding either to the front or rear of the bed of a pick-up truck or similar vehicle having a load space defined in part by first and second opposing side walls having a side rail mounted horizontally along each side wall, comprising:

a generally rectangular rigid panel member adapted for closely spaced transverse disposition between said opposing side walls of the vehicle load space;

rotatable wheel means mounted on at least one end of said panel, said wheel means being adapted to be mounted on a side rail for rotation thereon, thus allowing said panel to move along the length of said side rail; and means for releasably locking said panel member to at least one side rail, said locking means including a handle assembly mounted on said panel member, at least one spring biased locking pin mounted on an outer end of said panel, said handle assembly having means for moving said locking pin to a position wherein said pin is releasably held by said side rail, thereby locking said panel in a fixed position relative to said side rail and with said handle assembly further including means for moving said locking pin to a position in which said pin is released from said side rail, thereby allowing said panel to move relative to said side rail;

said handle assembly having a vertically operable handle pivotally connected by bolt means with a disk shaped release plate secured through a rod linkage to said locking pin, said release plate being pivotally connected to said handle at a position radially outwardly of the central portion of said plate;

said handle being of a generally C-shaped configuration and being provided at its lower end with a vertical arcuate channel in which is seated a pivot pin secured to said panel, said release plate being centrally mounted for rotation on said pivot pin, and wherein said channel is of suitable length to allow the handle to move upwardly while said release plate is rotated during the act of unlocking said locking pin.

2. The cargo securing device of claim 1 wherein said release plate is secured through a rod linkage on each side of the handle to a spring biased locking pin at each outer end of said panel.

3. The cargo securing device of claim 1, further including an inverted U-shaped grip member secured to said panel member so as to extend over the upper portion of said handle.

4. The cargo securing device of claim 1 wherein said wheel means includes two pairs of caster rollers rotatably mounted on each end of said panel, said side rail being of square cross section with an open interior and having a lower wall with a central channel provided along the length thereof, said rollers at one end of said panel being supportable on said lower wall, and wherein said rollers are secured to said panel by a support member adapted to be extended through said channel.

5. The cargo securing device of claim 4 wherein a pair of guide members are rotatably mounted on each support member and adapted to be positioned within said open interior of each side rail to assist in proper positioning of said caster rollers within each side rail.

6. The cargo securing device of claim 1 wherein each side rail has a plurality of openings spaced at intervals along the length thereof for receiving a locking pin.

7. The cargo securing device of claim 1 wherein said panel is provided with flanges which extend generally perpendicular from said panel so as to provide a shallow open box-like construction within which a portion of said handle assembly is retained.

8. The cargo securing device of claim 1 wherein said spring biased locking pin is mounted in a cylinder secured to said panel, said cylinder having a rod which connects said locking pin with said handle assembly, a coiled spring being positioned on the rod so as to be biased between said locking pin and one end of said cylinder.

* * * * *